United States Patent
Park et al.

(10) Patent No.: US 8,164,478 B2
(45) Date of Patent: Apr. 24, 2012

(54) DATA LOGGER HAVING DETACHABLE BATTERY FOR SUPPLYING POWER FOR OUTER SENSORS AND REBROADCASTING SYSTEM USING THEREOF

(76) Inventors: Tae Soo Park, Seoul (KR); Won Ho Kang, Incheon (KR); Sang Eok Park, Seoul (KR)

( * ) Notice: Subject to any disclaimer, the term of this patent is extended or adjusted under 35 U.S.C. 154(b) by 789 days.

(21) Appl. No.: 12/282,145

(22) PCT Filed: Feb. 28, 2007

(86) PCT No.: PCT/KR2007/001015
§ 371 (c)(1),
(2), (4) Date: Oct. 30, 2008

(87) PCT Pub. No.: WO2007/102668
PCT Pub. Date: Sep. 13, 2007

(65) Prior Publication Data
US 2009/0153358 A1    Jun. 18, 2009

(30) Foreign Application Priority Data
Mar. 9, 2006  (KR) .......................... 10-2006-0022358

(51) Int. Cl.
*G01V 3/00* (2006.01)
(52) U.S. Cl. ........................................ 340/855.8; 702/6
(58) Field of Classification Search ............... 340/855.8; 702/6
See application file for complete search history.

(56) References Cited

U.S. PATENT DOCUMENTS

| 522,694 | A | | 7/1894 | Ongley |
| 4,794,327 | A | * | 12/1988 | Fernandes ..................... 340/657 |
| 4,855,671 | A | * | 8/1989 | Fernandes ................ 340/870.17 |
| 6,327,918 | B1 | | 12/2001 | Lawless |
| 7,725,264 | B2 | * | 5/2010 | Pavel et al. .................. 340/853.2 |
| 2004/0267419 | A1 | * | 12/2004 | Jeng ................................ 701/36 |
| 2006/0020177 | A1 | | 1/2006 | Seo et al. |
| 2009/0259936 | A1 | * | 10/2009 | Tanskanen et al. ........... 715/700 |
| 2011/0062888 | A1 | * | 3/2011 | Bondy et al. .................. 315/294 |

FOREIGN PATENT DOCUMENTS

| JP | 2000-121508 A | | 4/2000 |
| KR | 2005108008 | * | 11/2005 |
| KR | 2006-0008835 A | | 1/2006 |

OTHER PUBLICATIONS

PCT/KR2007/001015 International Search Report.

* cited by examiner

*Primary Examiner* — Frederic L Lagman
(74) *Attorney, Agent, or Firm* — Lowe Hauptman Ham & Berner LLP

(57) ABSTRACT

A data logging apparatus is provided with a separate power supply for driving external sensors, a main module including an acceleration sensor, a memory unit, a control unit embedded with a clock unit for operating a measurement value of the acceleration sensor and storing the operated measurement value into the memory unit in a time series, and a first battery for supplying power to the acceleration sensor, the memory unit, and the control unit; a second battery detachably installed at one side main unit; and a sensor mounting module installed with a plurality of sensor resting units so that sensors can be attached and detached, for receiving the second battery inside so that power of the second battery can be supplied to the sensors installed in the sensor resting units, and transferring measurement signals of the sensors to the control unit.

2 Claims, 4 Drawing Sheets

[Fig. 1]
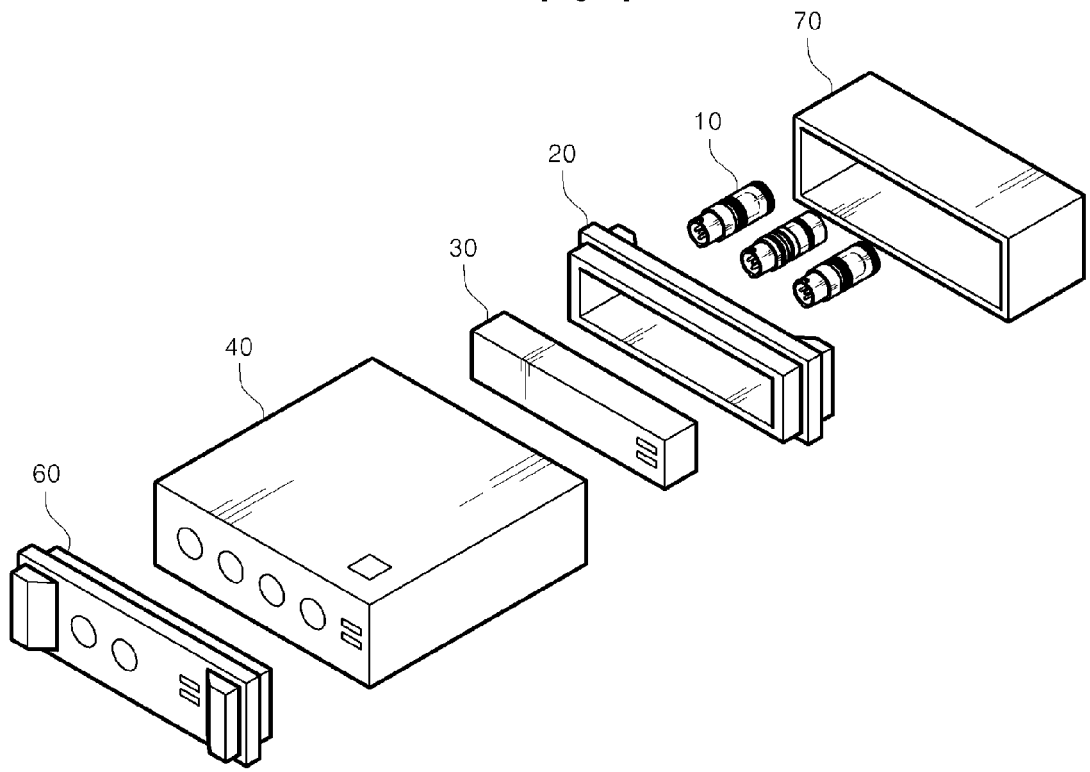
[Fig. 2]
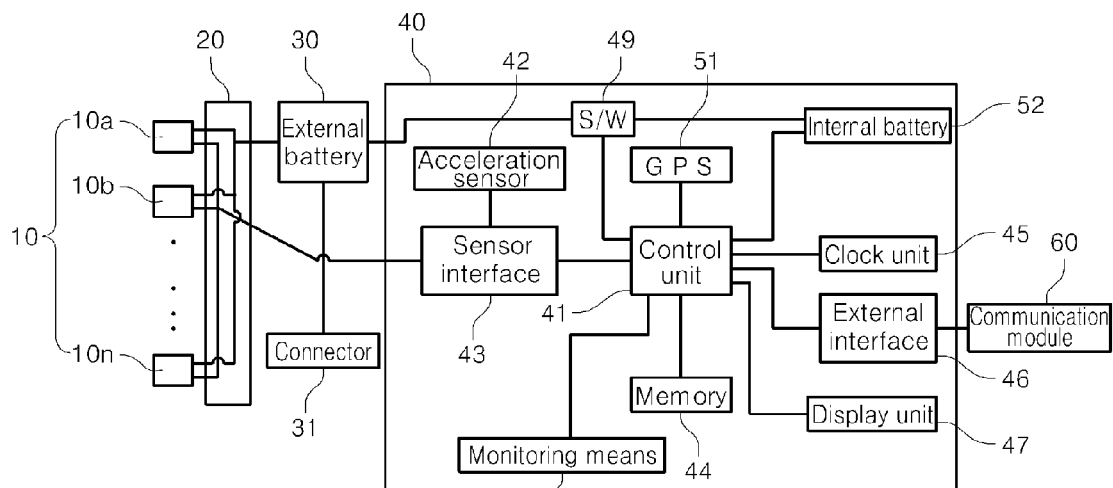
[Fig. 3]
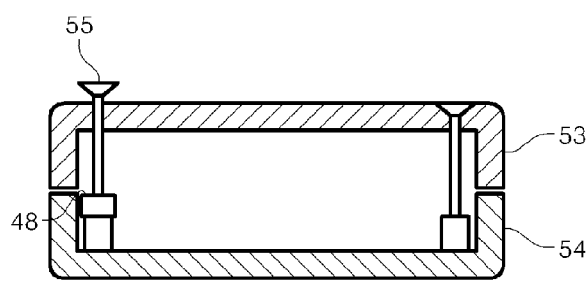

[Fig. 4]
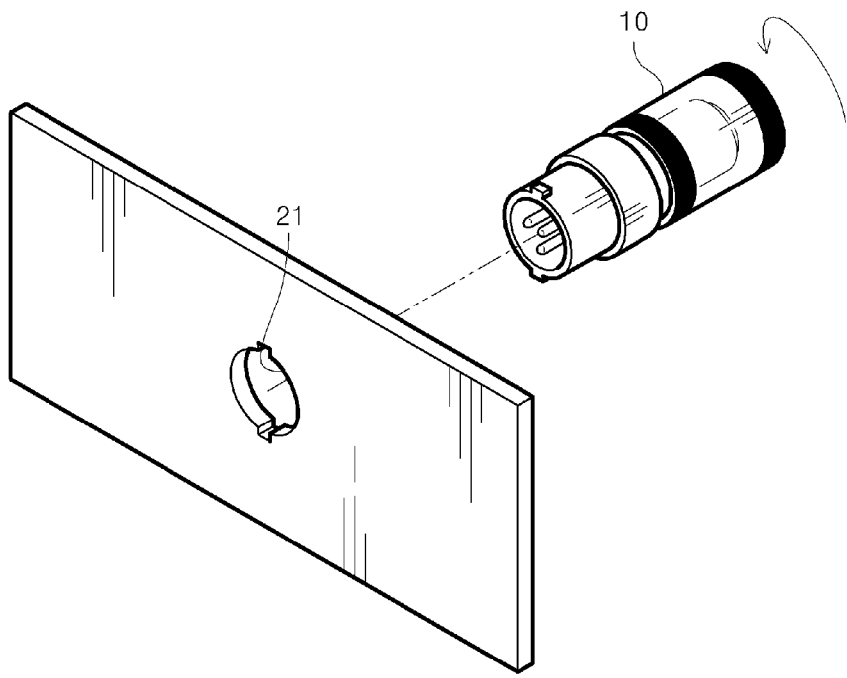
[Fig. 5]
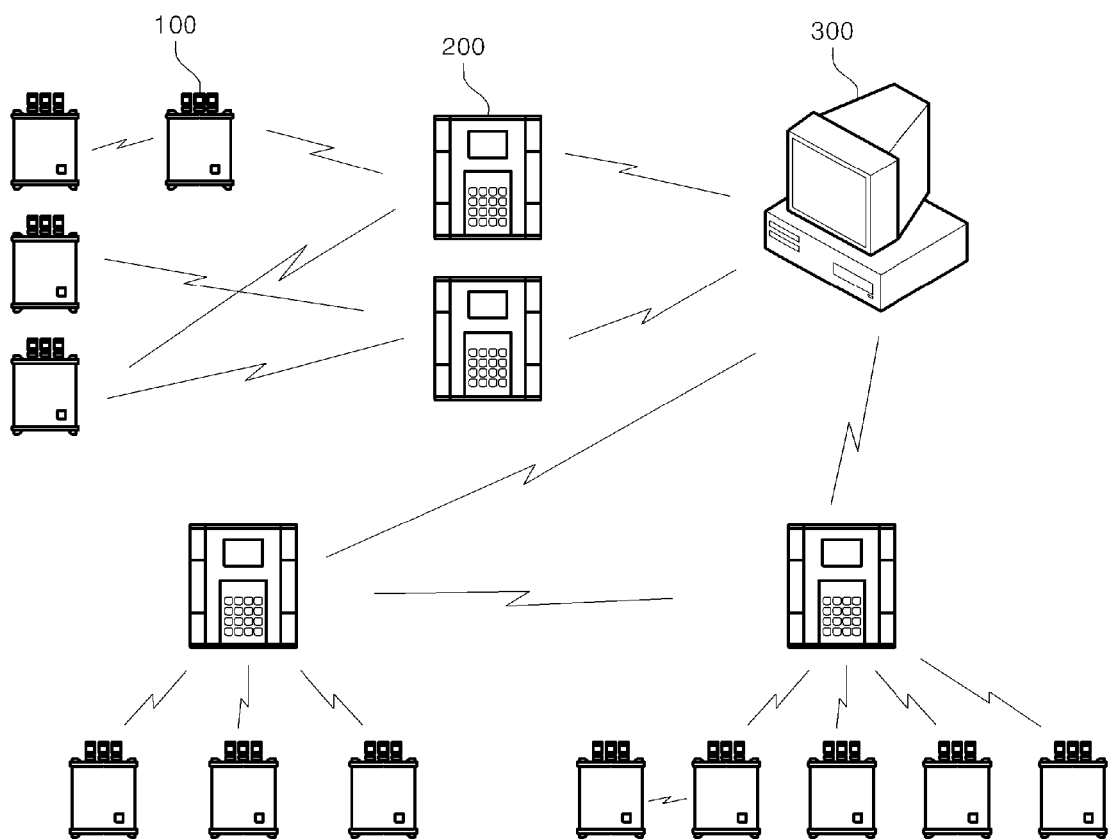

[Fig. 6]
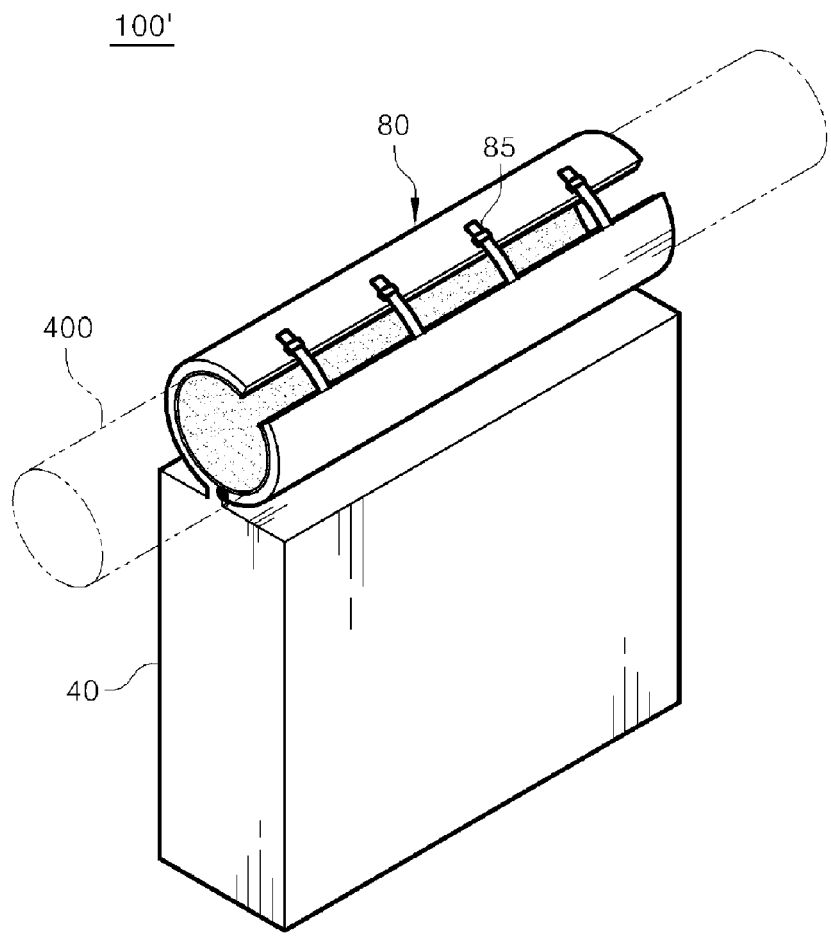
[Fig. 7]
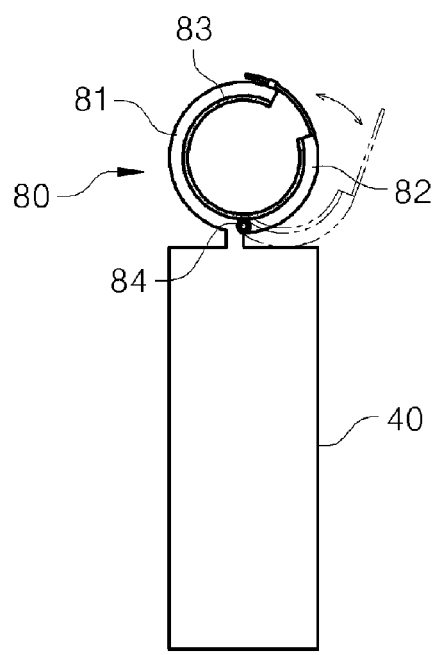

[Fig. 8]
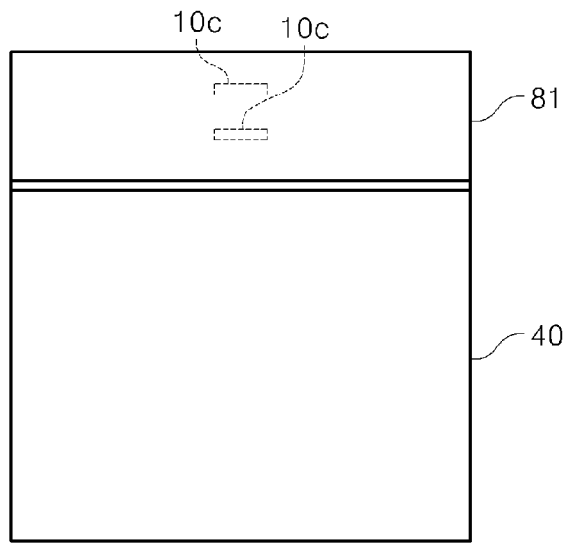
[Fig. 9]
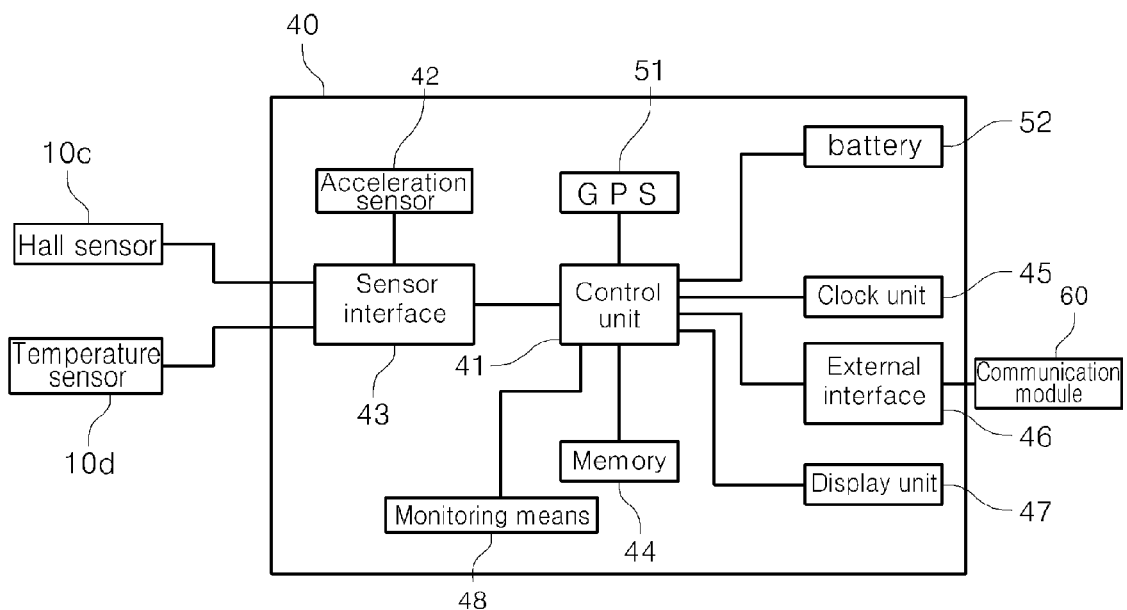

DATA LOGGER HAVING DETACHABLE BATTERY FOR SUPPLYING POWER FOR OUTER SENSORS AND REBROADCASTING SYSTEM USING THEREOF

TECHNICAL FIELD

The present invention relates to an apparatus attached to an object to measure physical quantities of the relevant object, and more particularly, to a data logging apparatus provided with a separate power supply for driving external sensors and a log data relay system using the data logging apparatus, wherein the data logging apparatus is provided with a separate power supply for sensors, a plurality of replaceable sensors for measuring physical quantities of the object, and a monitoring means for monitoring whether a main body has been disassembled.

BACKGROUND ART

In general, a data logging apparatus of a condition monitoring system is used to measure or control the temperature, vibration, flow rate, pressure or the like.

Parts sensitive to surrounding physical environments, e.g. a loading container used for carrying semiconductor wafers, can be susceptible to unfavorable environmental conditions. For example, due to the unfavorable environmental conditions within the loading container (e.g., temperature, humidity and/or pressure), gas can be produced from the loading container (typically, the loading container is formed of a resin material), and contents stored within the loading container (e.g., semiconductor wafers) can be contaminated due to the produced gas. Further, shock and vibration applied to the loading container may create relative motions between the container and the contents therein. The relative motions or friction between the loading container and the contents such as semiconductor wafers can lead to the generation of particulates (the particulates are produced from the wafer materials as well as the loading container), and accordingly, such particulates can contaminate the wafers stored in the loading container.

If the semiconductor wafers are affected by any one of the aforementioned environmental conditions while they are carried, the resultant damages (e.g., fine fractures, chemical contamination, or particulate contamination) are often indistinguishable and difficult to find out. In addition, such damages (or influences from such damages) are hardly noticed until the manufacture of integrated circuit (IC) devices is almost completed (i.e., until a final electrical test). As a result, not only the loss of the damaged IC parts but also the loss of resources consumed to dispose of damaged devices that cannot be manufactured into marketable products are incurred. Accordingly, significant environmental damages can lead to low production yield and high production costs.

A data logging apparatus is attached directly to a loading container for carrying an object sensitive to surrounding physical environments, such as semiconductor wafers, or to a packing box of the object to measure and store the changes in physical quantities occurring while the object is carried, so that the measure and stored quantities are used as base data required for analyzing the shipping environments.

However, since the conventional data logging apparatus is attached directly to an object or is carried together with the object, electric power is supplied by a battery. Thus, there is a problem in that data on the physical quantities are not logged if the battery is discharged due to the use of the data logging apparatus for an extended period of time.

Further, only predetermined physical quantities can be measured in accordance with the types of installed sensors, and thus, there is disadvantage in that the data logging apparatus is not sufficiently compatible when measuring physical quantities according to characteristics of various kinds of objects. Particularly, if an installed sensor is out of order, the whole apparatus should be disassembled or replaced to exchange the sensor with another new one.

In addition, if the aforementioned measuring apparatus is installed to monitor the state of fixtures, such as fences, installed in an extended area, measured data from the measuring apparatus are transmitted to a main center via wireless or wired communication. Since the remotely installed measuring apparatus that is remote from the main center should transmit signals of high output power to communicate with the main center in a wired or wireless way, power consumption is too high. Accordingly, there is a problem in that data are not logged due to the discharge of battery.

DISCLOSURE OF INVENTION

Technical Problem

The present invention is conceived to solve the aforementioned problems. Accordingly, an object of the present invention is to provide a data logging apparatus provided with an additional battery for supplying power only to high power-consuming sensors.

Another object of the present invention is to provide a data logging apparatus, wherein sensors are replaceably installed such that various kinds of physical quantities can be easily measured according to characteristics of objects attached thereto.

A further object of the present invention is to provide a data logging apparatus, wherein if a main body of the data logging apparatus is disassembled, the disassembly is notified to the outside and internal logging data are reset to thereby prevent arbitrary data manipulation.

A still further object of the present invention is to provide a log data relay system, wherein a plurality of the data logging apparatuses are installed to communicate with one another via wired/wireless communication.

Technical Solution

According to an aspect of the present invention for achieving the objects, there is provided a data logging apparatus provided with a separate power supply for driving external sensors, which comprises a main module including an acceleration sensor, a memory, a control unit mounted with a clock unit for operating a measurement value of the acceleration sensor and storing the operated value into the memory in a time series, and a first battery for supplying power to the acceleration sensor, the memory and the control unit; a second battery detachably installed to one side of the main module; and a sensor mounting module formed with a plurality of sensor mounting portions to witch sensors are detachably installed, and configured to supply power of the second battery to the sensor installed in the sensor mounting portion by using the second battery installed therein and to transmit a measurement signal of the sensor to the control unit.

The main module may further include a sensor interface for receiving the measurement signal of the sensor mounting module, converting the received sensor measurement signal into a digital signal, and outputting the digital signal to the control unit; an external interface for receiving an external input, transmitting the external input to the control unit as a signal, and electrically connecting with an external device; a memory for receiving a control signal of the control unit and storing sensing data of a plurality of the sensors; a display unit for receiving a control signal from the control unit and displaying the received control signal to the outside; a GPS unit for obtaining position information; and a switch for blocking the power of the second battery from being supplied to the first battery. Further, the control unit may monitor a power state of the first battery in such a manner that when the power of the first battery is lower than a set value, a control signal for notifying a low power state to the outside is outputted and an ON-operation signal is outputted to the switch so that power of the second battery is supplied to the first battery.

A connector for connecting with an external power supply may be further installed in the second battery such that the second battery is charged with power received from the outside.

A communication module for communicating with an external device may be connected to the external interface of the main module.

The main module may be hermetically sealed with an upper case, a lower case and a fastening means for fastening the upper and lower cases to each other. Further, the connecting means may be further provided with a monitoring means for outputting a signal when the upper and lower cases are disengaged from each other, and the control unit of the main module may receive the signal from the monitoring means, display the received signal to the outside and output a control signal for blocking access to the sensing data recorded in the memory.

Each of the plurality of sensors may further include a memory for recording unique identification (ID) information, and the control unit of the main module receives the ID information from the memory and identifies a sensor type.

According to another aspect of the present invention, there is provided a re-broadcasting system provided with a plurality of data logging apparatuses. Here, each of the data logging apparatuses comprises a communication module for communicating with the other data logging apparatuses, a control unit for controlling the communication module, and a memory for recording unique ID information; and the control unit receives a relay request signal containing the ID information through the communication module from one data logging apparatus, and transmits the received relay request data and set signal of the relevant data logging apparatus to the other neighboring data logging apparatus.

According to a further aspect of the present invention, there is provided a data logging apparatus for cables, which comprises a hollow cable mounting means taking the shape of a cylinder with both open sides, in which a cable is securely seated; and a main module including a three-axis acceleration sensor, a memory, a control unit mounted with a clock unit for operating a measurement value of the three-axis acceleration sensor and storing the operated value into the memory in a time series, a battery for supplying power to the acceleration sensor, the memory, and the control unit. In such a case, the cable mounting means may comprise a fixed portion, a movable portion installed to be pivoted on a hinge for allowing the cable to be easily mounted into the cable mounting means, and a fixing means for fixing the fixed portion and the movable portion to each other, a friction member may be further installed on an inner circumferential surface of the cylinder composed of the fixed portion and the movable portion to prevent the cable from being moved, due to a frictional force between the cable and the friction member, when the cable is mounted, and a temperature sensor and a hall sensor may be installed to the fixed portion.

The main module mat further include a sensor interface for receiving a measurement signal from the temperature sensor and the hall sensor, converting the measurement signal into a digital signal, and outputting the digital signal to the control unit; an external interface for receiving an external input, transmitting the external input to the control unit as a signal, and electrically connecting with an external device; a display unit for receiving a control signal from the control unit and displaying the control signal to the outside; and a GPS unit for obtaining position information.

BRIEF DESCRIPTION OF THE DRAWINGS

FIG. 1 is an exploded perspective view of a data logging apparatus according to an embodiment of the present invention.

FIG. 2 is a block diagram of the data logging apparatus according to an embodiment of the present invention.

FIG. 3 is a sectional view of a main module that is hermetically sealed with upper lower cases of the data logging apparatus according to an embodiment of the present invention.

FIG. 4 is a view illustrating the coupling of a sensor to a sensor mounting module in the data logging apparatus according to an embodiment of the present invention.

FIG. 5 is a view illustrating a rebroadcasting system using the data logging apparatus shown in FIGS. 1 to 4.

FIG. 6 is a perspective view of a according to another embodiment of the present invention.

FIG. 7 is a side view of the shown in FIG. 6.

FIG. 8 is a rear view of the shown in FIG. 6.

FIG. 9 is a block diagram illustrating the operation of the data logging apparatus for cables.

EXPLANATION OF REFERENCE NUMERALS FOR MAIN PORTIONS IN DRAWINGS

10 sensor 20 sensor mounting module
30 external battery 40 main module
60 communication module

BEST MODE FOR CARRYING OUT THE INVENTION

Hereinafter, preferred embodiments of the present invention will be described in more detail with reference to the accompanying drawings.

FIG. 1 is an exploded perspective view of a data logging apparatus according to an embodiment of the present invention, FIG. 2 is a block diagram of the data logging apparatus according to an embodiment of the present invention, FIG. 3 is a sectional view of a main module that is hermetically sealed with upper and lower cases of the data logging apparatus according to an embodiment of the present invention, and FIG. 4 is a view illustrating the coupling of a sensor to a sensor mounting module in the data logging apparatus according to an embodiment of the present invention.

A data logging apparatus 100 of the present invention comprises a sensor mounting module 20 to which a plurality of sensors 10 are detachably installed, an external battery 30, a main module 40, and a communication module 60.

The main module 40 comprises an acceleration sensor 42; a memory 44; a control unit 41 for operating a measured value of the acceleration sensor 42 and storing the value into the memory 44 in a time series using a clock unit 45; an internal battery 52 for supplying power to the acceleration sensor 42, the memory 44 and the control unit 41; a sensor interface 43 for receiving a measurement signal from a sensor in the sensor mounting module 20, converting the received signal into a digital signal and outputting the digital signal to the control unit 41; an external interface 46 for receiving an external input, transferring the external input to the control unit 41 as a signal, and electrically connecting to an external device; a display unit 47 for displaying a control signal received from the control unit 41 to the outside; a GPS unit 51 for obtaining position information; and a switch 49 for blocking power of the external battery 30 from being supplied to the internal battery 52.

The control unit 41 monitors a power state of the internal battery 52 in such a manner that when the power of the internal battery is lower than a set value, a control signal for notifying a low power state to the outside is outputted and an ON-operation signal is then outputted to the switch 49 such that power of the external battery 30 is supplied to the internal battery 52.

The sensor mounting module 20 is formed with a sensor mounting portion 21 such that a sensor can be detachably mounted as shown in FIG. 4. The sensor mounting module 20 accommodates the external battery 30 therein to allow electric power from the external battery 30 to be supplied to a plurality of sensors 10 installed in the sensor mounting portion 21, and also transmits the measurement signals of the sensors to the control unit 41 of the main module 40. A plurality of the sensor mounting portions 21 may be formed.

The communication module 60 serves to communicate with external devices and is connected to the external interface 46 of the main module 40. In addition, a connector 31 for connecting with an external power supply is further installed in the external battery 30 such that the external battery can be charged with electric power received from the outside. A battery for supplying power necessary to operate only the communication module may be further installed in the communication module 60. This reason is that the communication module can output an emergency signal to notify the discharge of the external and internal batteries 30 and 52 to the outside when both of the batteries are discharged. At this time, the battery for supplying power necessary to operate only the communication module may be further provided with a separate connector for receiving external constant power and charging the battery.

As shown in FIG. 3, the main module 40 is hermetically sealed with an upper case 53, a lower case 54 and fastening means 55 for fastening the upper and lower cases 53 and 54 to each other. The fastening means 55 is further provided with a monitoring means 48 designed to output a signal when the upper and lower cases 53 and 54 are disengaged from each other. The control unit 41 of the main module 40 receives a signal from the monitoring means 48, displays the received signal to the outside and outputs a control signal for deleting the sensing data recorded in the memory 44.

In the data logging apparatus of the embodiment as described above, sensors 10a to 10n for measuring physical quantities can be selectively installed to the sensor mounting module 20 and thus data of a relevant object or mobile body can also be logged. Thus, there is an advantage in that the data logging apparatus is highly compatible for an object or a mobile body having a variety of physical characteristics.

The sensor interface 43 of the main module 40, which has received a sensing signal from the sensor mounting module 20 mounted with a plurality of the sensors 10, converts the received signal into a digital signal and then outputs the digital signal to the control unit 41. At this time, the acceleration sensor 42 is fixedly installed within the main module 40, because the acceleration sensor 42 is indispensable for the data logging apparatus and thus is never replaced. The control unit 41 receives the sensing signal which has been converted into the digital signal by the sensor interface 43 and stores the received sensing signal into the memory 44. At this time, the control unit 41 also receives time data from the clock unit 45 and outputs a control signal to store the sensing data in a time series. Together with the position information data of the GPS unit 51, the sensing data stored in the memory 44 as described above can be transmitted to the outside via wired or wireless communication using the communication module 60 connected through the external interface 46, i.e., transmitted to an external device such as a personal computer 300 that is directly connected to the external interface 46.

At this time, a plurality of the sensors 10 operate with the power supplied by the external battery 30, and the main module 40 operates with the power supplied from the internal battery 52. The external battery 30 is further provided with the connector 31 through which the battery 30 can be charged from the outside, and thus, the connector 31 can be connected to an external power supply, i.e. a constant power supply, to charge the external battery 30. In addition, the control unit 41 monitors the power state of the internal battery 52 such that when the power level is lower than a predetermined power level, an ON-operation signal is outputted to the switch 49 so that the power of the external battery 30 is supplied to the internal battery 52.

As shown in FIG. 3, the main module 40 is hermetically sealed with the upper and lower cases 53 and 54 which in turn are fastened to each other by the fastening means 55. The monitoring means 48 for monitoring whether the upper and lower cases 53 and 54 are disengaged from each other is installed in the fastening means to monitor whether they are arbitrary or inadvertently disassembled or disengaged from each other. Although it has been described by way of example that the monitoring means 48 is a pressure sensor which senses the pressure change occurring when the fastening means 55 is released and outputs a sensing signal when the pressure change is greater than a set value, the present invention is not limited thereto. When receiving the sensing signal from the monitoring means 48, the control unit 41 notifies the release of the fastening means to the outside by outputting a control signal to the display unit 47 and also outputs another control signal for blocking the access to the data stored in the memory 44. That is, the stored data of the memory 44 are collectively deleted or a connection key code of the data is randomly changed to ensure the integrity of data by maintaining the data but blocking the access thereto.

In addition, the main module 40 may be filled with an inert gas such that the inert gas is discharged when the cases 53 and 54 are separated or disengaged from each other. The separation or disengagement can be determined based on whether the gas has been discharged, which can be used as a means for determining reliability.

Furthermore, when the fastening means 55 is to be released after the upper and lower cases 53 and 54 have been engaged with each other, a connection hole (not shown) or the like may be configured to be broken or damaged such that it can be mechanically determined whether the cases are separated or disengaged from each other.

FIG. 5 shows a case where a plurality of the aforementioned data logging apparatuses 100 are installed. For example, facilities such as fences are installed in an extended area, and a plurality of the data logging apparatuses 100 for monitoring the state of the fences are installed at regular intervals. Each of the data logging apparatuses 100 transmits sensing data to a main center, i.e. the computer 300, at regular intervals of time. At this time, when the data logging apparatus 100 remote from the computer 300 communicates with the computer 300 through the communication module 60, the data logging apparatus should transmit output signals with intensity higher than a predetermined level, and thus, the power consumption is increased too much.

Accordingly, since unique ID information of a relevant data logging apparatus 100 is additionally recorded in the memory 44 of the main module 40, the control unit 41 can output a relay request signal including the ID information recorded in the memory 44 to the outside. If the relay request signal, which includes data for notifying the request of data transmission or the occurrence of emergency such as battery discharge, is inputted from a neighboring or predetermined data logging apparatus 100, the control unit 41 receives the data and outputs or transmits a relay request signal to another data logging apparatus 100 or computer 300. That is, the respective data logging apparatuses 100 are configured to communicate with one another to relay data or relay request signals. A relay terminal 200 of FIG. 5 can relay data and signals of each data logging apparatus 100 and electrically connect with an additional device to receive data, setting signals or the like from a data logging apparatus 100.

In the meantime, a separate external sensor may be connected to the external interface 46. That is, in a case where physical data are to be obtained from a place where the data logging apparatus 100 of the embodiment is difficult to be installed, it is possible to install only the external sensor at a desired place and transmit sensing data from the sensor to the computer 300 via communication.

In addition, the external sensor connected to the external interface 46 and the sensor(s) 10 mounted to the sensor mounting module 20 of the data logging apparatus 100 may be further provided with a memory (not shown) in which unique ID information of each sensor is recorded. Accordingly, the computer 300 of the main center, the control unit 41 of each data logging apparatus 100 or the relay terminal 200 can recognize each of the sensors. In other words, the computer 300, the control unit 41, and the relay terminal 200 can automatically identify the external sensor and the sensors 10 mounted to the sensor mounting module 20 and a sensing data type thereof through the ID information of the sensors.

FIGS. 6 to 9 show a data logging apparatus according to another embodiment of the present invention. That is, FIG. 6 is a perspective view of the data logging apparatus for cables according to another embodiment of the present invention, FIG. 7 is a side view of the data logging apparatus for cables shown in FIG. 6, FIG. 8 is a rear view of the data logging apparatus for cables shown in FIG. 6, and FIG. 9 is a block diagram illustrating the operation of the data logging apparatus for cables.

The data logging apparatus 100' of the embodiment is installed to electrical cables of power transmission facilities, optical cables, steel cables for bridges, or the like to sense the change in tension of the cables, the speed and amount of wind, and the like.

First, the configuration of the data logging apparatus 100' for cables according to this embodiment will be described with reference to the perspective view of FIG. 6.

The data logging apparatus 100' of the embodiment is provided with a cable mounting means 80 installed on top of the main module 40. The main module 40 is the same as the main module 40 of the data logging apparatus shown in FIGS. 1 to 5.

On an inner circumferential surface of the cable mounting means 80, a friction member 83 is installed to prevent the data logging apparatus 100' from being slipped (e.g., moved or rotated) by external factors such as wind after the data logging apparatus has been installed on the cable. The cable mounting means 80 is composed of a fixed portion 81 and a movable portion 82, and the movable portion 82 is pivoted on a hinge 84 such that the cable 400 can be easily mounted into the cable mounting means 80.

The cable 400 mounted by the fixed portion 81 and the movable portion 82 is fixed by a fixing means 85. The fixing means 85 utilizes a cable tie method in which its length can be easily adjusted according to the diameter of the cable 400 to be inserted.

Further, a hall sensor 10c and a temperature sensor 10d are embedded into the fixed portion 81. The control unit 41 of the main module 40 can calculate current and voltage values through a predetermined formula using the cable temperature and the sensing data of the hall sensor 10c in a case where the cable is an electrical cable.

The data logging apparatus 100' of this embodiment may be installed to cables for bridges and power transmission facilities. In such a case, the control unit 41 of the main module 40 can calculate the amount and speed of wind, the change in tension of a relevant cable and the like according to a predetermined formula using external environmental factors, i.e. sensing data of the acceleration sensor 42 of the main module 40 which are sensed when the data logging apparatus is swayed by the wind.

INDUSTRIAL APPLICABILITY

According to the data logging apparatus of the present invention so configured, an additional battery for supplying power only to a high power-consuming sensor is further provided, whereby a highly reliable data logging apparatus can be obtained.

In addition, since a plurality of sensors are detachably installed, an appropriate sensor can be used in accordance with characteristics of objects to be measured. Thus, there is an advantage in that the data logging apparatus is highly compatible.

Since the data logging apparatus is also provided with a monitoring means for preventing arbitrary disassembly of the module, there is another advantage in that highly reliable measurement data can be obtained.

Although the preferred embodiments have been described herein with reference to the accompanying drawings, it is to be understood that the present invention is not limited to those preferred embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A data logging apparatus for cables, the apparatus comprising:
   a hollow cable mounting member taking the shape of a cylinder with both open sides, in which a cable is securely seated; and
   a main module including a three-axis acceleration sensor, a memory, a control unit mounted with a clock unit for operating a measurement value of the three-axis acceleration sensor and storing the operated value into the memory in a time series, a battery for supplying power to the acceleration sensor, the memory, and the control unit,
   wherein the cable mounting member comprises a fixed portion, a movable portion installed to be pivoted on a hinge for allowing the cable to be easily mounted into the cable mounting member, and a fixing element for fixing the fixed portion and the movable portion to each other,
   a friction member is further installed on an inner circumferential surface of the cylinder composed of the fixed portion and the movable portion to prevent the cable from being moved, due to a frictional force between the cable and the friction member, when the cable is mounted, and a temperature sensor and a hall sensor are installed to the fixed portion.

2. The apparatus as claimed in claim 1, wherein the main module further includes:

a sensor interface for receiving a measurement signal from the temperature sensor and the hall sensor, converting the measurement signal into a digital signal, and outputting the digital signal to the control unit;

an external interface for receiving an external input, transmitting the external input to the control unit as a signal, and electrically connecting with an external device;

a display unit for receiving a control signal from the control unit and displaying the control signal to the outside; and a GPS unit for obtaining position information.

* * * * *